United States Patent
Frank et al.

(10) Patent No.: US 8,315,922 B2
(45) Date of Patent: Nov. 20, 2012

(54) REAL ESTATE INVESTMENT DETERMINATOR

(75) Inventors: Scott Frank, Dunwoody, GA (US); Andrew Hart Heller, Atlanta, GA (US)

(73) Assignee: Regular Riches LLC, Atlanta, GA (US)

( * ) Notice: Subject to any disclaimer, the term of this patent is extended or adjusted under 35 U.S.C. 154(b) by 820 days.

(21) Appl. No.: 12/022,818

(22) Filed: Jan. 30, 2008

(65) Prior Publication Data

US 2009/0192948 A1 Jul. 30, 2009

(51) Int. Cl.
*G06Q 40/00* (2006.01)
(52) U.S. Cl. ..................... 705/27.1; 705/26.1
(58) Field of Classification Search ............. 705/36 R, 705/26.1, 27.1
See application file for complete search history.

(56) References Cited

U.S. PATENT DOCUMENTS

| | | | |
|---|---|---|---|
| 6,643,639 B2 * | 11/2003 | Biebesheimer et al. | 707/709 |
| 2003/0083957 A1 * | 5/2003 | Olefson | 705/27 |
| 2005/0144125 A1 * | 6/2005 | Erbey et al. | 705/40 |
| 2006/0015364 A1 * | 1/2006 | Hays | 705/1 |
| 2008/0313094 A1 * | 12/2008 | Wright | 705/36 R |

OTHER PUBLICATIONS

RealEstate.com research shows consumers fear real estate transactions; enhanced site provides tools, resources for which consumers are searching. (Oct. 20, 1999). PR Newswire, pp. 1-1. Retrieved Sep. 17, 2012.*

* cited by examiner

*Primary Examiner* — Kito R Robinson
(74) *Attorney, Agent, or Firm* — Taylor English Duma LLP (57) ABSTRACT

Included are embodiments for providing investment data. One embodiment of a method includes providing an interface with predetermined criteria and at least one field, the at least one field configured to receive user input, the interface configured to provide investment data for at least one piece of property and receiving user input for the at least one field. Some embodiments include automatically determining investment data for the at least one piece of property, based on the received user input for the at least one field.

9 Claims, 8 Drawing Sheets

Buy Low Calculator

KEY: Cells require data to be entered

Cells use pre-set estimates Or enter your own data.

SAMPLE PROPERTY A
PROPERTY ID: 1234 North Shore Drive
Your Town, CA 12345

| Fair Market Value of property | (FMV) | | | a | $350,000 |
|---|---|---|---|---|---|
| Repairs, Improvements and other Costs | | | 404 | | |
| Repairs and Improvements | (R&I) | | 50,000 | b | 406 |
| Finance Costs | (shortcut estimate 2% of FMV) | 408 | 7,000 | c | |
| Legal Costs | (Shortcut estimate $500) | | 500 | d | 410 |
| Taxes and Insurance Costs | (shortcut estimate 1/3 of 1% of FMV) | | 1,167 | e | |
| Marketing Costs | (shortcut estimate $2,500) | | 2,500 | f | 414 |
| Mortgage Payments | (shortcut estimate 1% of FMV) | 412 | 3,500 | g | |
| Utility Costs | (shortcut estimate 1/3 of 1% of FMV) | | 1,167 | h | 418 |
| Miscellaneous Costs | (shortcut estimate 1% of FMV) | 416 | 3,500 | i | |
| Total R&I + Other Costs | (R&I + OC Subtract from FVM) | | 69,333 | j | -69,333 |
| | | 420 | | | |
| Investor Discount Calculation | | 422 | | | |
| Minimum Investor Discount | (MID%) | | 10% | 424 k | |
| Repairs and Improvements Hassle | (RIH%) | 426 | 5% | l | |
| Negative Property Attributes | (NPA%) | 427 | 9% | 428 m | |
| Length of Time on Market | Months | (LTM%) | 9 | 7% | n | |
| Total Investor Discount | (TID Subtract from FMV) | | 31% of FMV | o | -108,500 |
| Ceiling Price | Maximum Purchase Price | (CP | MPP) | 432 | | p | $172,167 |
| | | 430 | 434 | | |
| Wiggle Room Discount (% of FMV to subtract) | | | 25% of FVM | q | -87,500 |
| Initial Offer Price | (IOP) | 436 | 438 | r | $84,667 |
| | | | 440 | | |

442

Key Data Summary

| Fair Market Value | (FMV) | | $350,000 |
|---|---|---|---|
| Total Repair, Improvements + Other Costs | (R&I + OC) | | -69,333 |
| Total Investor Discount | (TID) | 31% | -108,500 |
| Ceiling Price | Maximum Purchase Price | (CP | MPP) | | 172,167 |
| Wiggle Room Discount | (WRD) | 25% | -87,500 |
| Initial Offer Price | (IOP) | | 84,667 |

444

Property Comment:

Property likely on the market long due to two uncorrectable NPA. Lot size is 30% smaller than other homes in the neighborhood. The property is first property in the subdivision bordering a very busy street (NPA estimates 3% for the lot size and 6% for the location of the home)

FIG. 4

Rent Smart Calculator

SAMPLE PROPERTY A
PROPERTY ID:    1234 North Shore Drive
                Your Town, CA 12345

Fair Market Value of property (FMV) — 502 → a

Sales Price (to lessee-purchaser)
(shortcut estimates FMV rounded down to nearest $900) — 504 → b Rental Payment
(shortcut estimates 1% of sales price rounded down to nearest $95) — 506 → c Security Deposit
(shortcut estimates same as rental payment) — 508 → d Option Money
(shortcut estimates rental payment rounded down to nearest $500) — 510 → e Monthly Applied Rent
(shortcut estimates 10% of rental payment rounded to nearest $50) — 512 → f Length of Lease-Purchase
(shortcut estimates years) — 514, # of years = 3.00 → g Money Needed Now
(MNN = Rental Payment + Security Deposit + Option Money) — 516 → h, 518

Money Accumulated Potential
(MAP = Security Deposit + Option Money + Monthly Applied Rent for length of lease) — 520

522

| Key Data Summary | |
|---|---|
| Fair Market Value | (FMV) |
| Sales Price | (SP) |
| Rental Payment | (RP) |
| Security Deposit | (SD) |
| Option Money | (OM) |
| Monthly Applied Rent | (MAR) |
| Length of Lease-Purchase | (LLP) |
| Money Needed Now | (MNN) |
| Money Accumulated Potential | (MAP) |

Property Comment: — 524

FIG. 5

Rent Smart Calculator

KEY
- Cells require data to be entered
- Cells use pre-set estimates Or enter your own data.

600

SAMPLE PROPERTY A
PROPERTY ID: 1234 North Shore Drive
Your Town, CA 12345

Fair Market Value of property (FMV) — 602 → a $300,000

Sales Price (to lease-purchaser)
(shortcut estimates FMV rounded down to nearest $900) — 604 → b  299,900

Rental Payment
(shortcut estimates 1% of sales price rounded down to nearest $95) — 606 → c  2,995

Security Deposit
(shortcut estimates same as rental payment) — 608 → d  2,995

Option Money
(shortcut estimates rental payment rounded down to nearest $500) — 610 → e  2,500

Monthly Applied Rent
(shortcut estimates 10% of rental payment rounded to nearest $50) — 612 → f  300

Length of Lease-Purchase
(shortcut estimates years) — 614 # of years = 3.00 → g  36 months Money Needed Now
(MNN = Rental Payment + Security Deposit + Option Money) — 616 → h  8,490

Money Accumulated Potential
(MAP = Security Deposit + Option Money + Monthly Applied Rent for length of lease) — 618, 620 → i  16,295

622

Key Data Summary

| | | |
|---|---|---|
| Fair Market Value | (FMV) | $300,000 |
| Sales Price | (SP) | 299,900 |
| Rental Payment | (RP) | 2,995 |
| Security Deposit | (SD) | 2,995 |
| Option Money | (OM) | 2,500 |
| Monthly Applied Rent | (MAR) | 300 |
| Length of Lease-Purchase | (LLP) | 36 mounths |
| Money Needed Now | (MNN) | 8,490 |
| Money Accumulated Potential | (MAP) | 16,295 |

624

Property Comment:

REAL ESTATE INVESTMENT DETERMINATOR

BACKGROUND

Investors and consumers often utilize real estate as a primary residence, as a secondary residence, and/or as an investment opportunity. As such, determining purchase, sale, and lease prices for real estate (and other investments) may be a difficult task. Often times, investors and consumers will manually factor a plurality of criteria to determine a purchase, sale, or lease price. As the consumer or investor may not understand the most applicable criteria for a particular piece of property, errors in the price calculation can occur. Additionally, in the manual determination of price, calculation errors can occur, also yielding a price that may be more or less than a desired price for the property. As the introduction of errors can prevent a seller from maximizing profit or a buyer from realizing the best price, new techniques are desired.

SUMMARY

Included are embodiments for providing investment data. One embodiment of a method includes providing an interface with predetermined criteria and at least one field, the at least one field configured to receive user input, the interface configured to provide investment data for at least one piece of property and receiving user input for the at least one field. Some embodiments include automatically determining investment data for the at least one piece of property, based on the received user input for the at least one field.

Also disclosed are embodiments of a system. At least one embodiment of a system includes a providing component configured to provide an interface with predetermined criteria and at least one field, the at least one field configured to receive user input, the interface configured to provide investment data for at least one piece of property and a receiving component configured to receive a user input for the at least one field. Some embodiments include a determining component configured to automatically determine investment data for the at least one piece of property, based on the received user input for the at least one field.

Also included are embodiments of a computer readable storage medium. At least one embodiment of a computer readable storage medium includes providing logic configured to provide an interface with predetermined criteria and at least one field, the at least one field configured to receive user input, the interface configured to provide investment data for at least one piece of property and receiving logic configured to receive a user input for the at least one field. Some embodiments include determining logic configured to automatically determine investment data for the at least one piece of property, based on the received user input for the at least one field.

Other systems, methods, features, and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Figure 1:
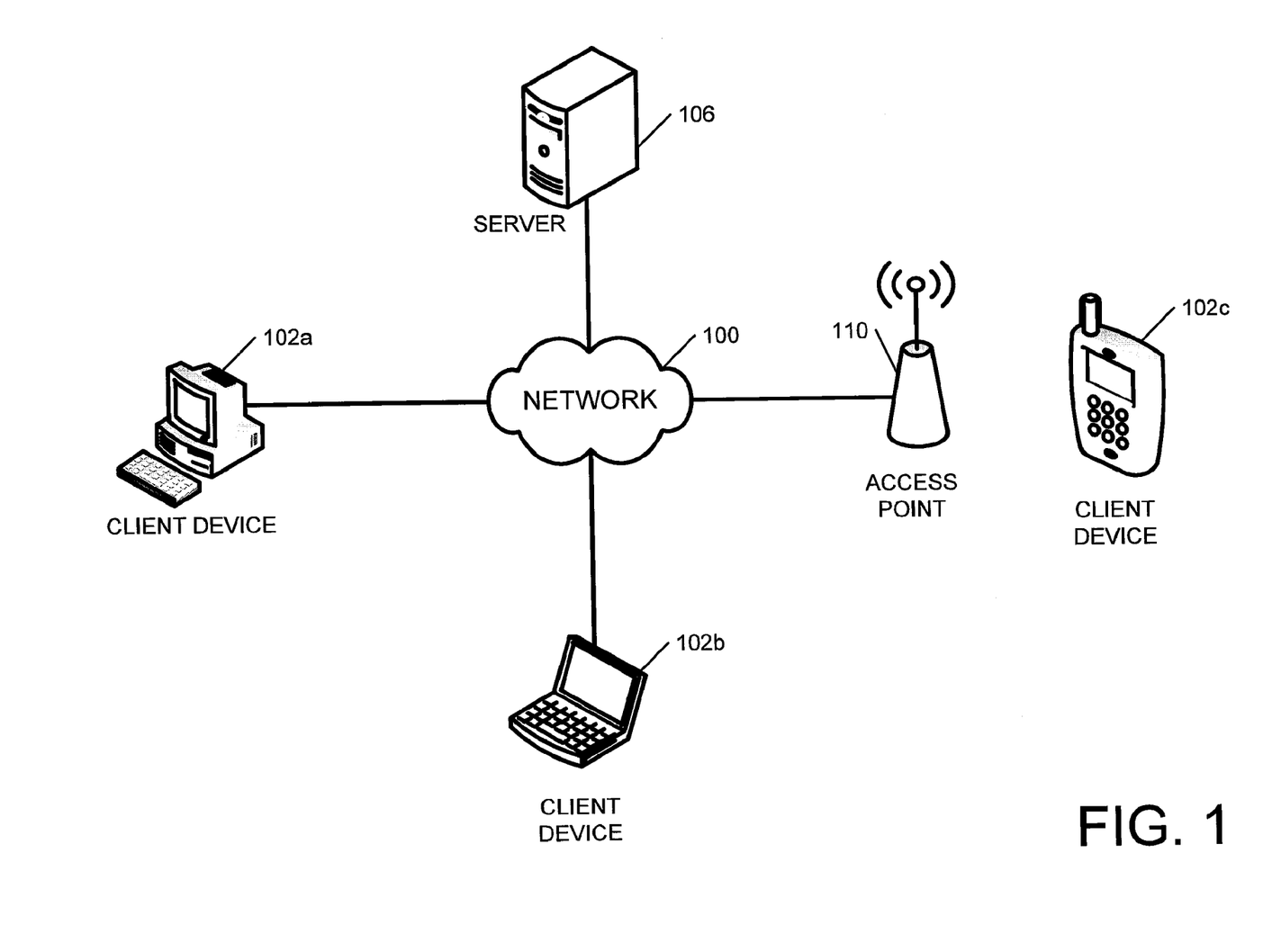
FIG. 1 is a diagram illustrating an exemplary embodiment of a network that may be utilized for an investment determination.

FIG. 1 is a diagram illustrating an exemplary embodiment of a network that may be utilized for an investment determination. As illustrated in the nonlimiting example of FIG. 1, a network may be coupled to one or more client devices 102. More specifically, the network 100 may include a Public Switched Telephone Network (PSTN), a mobile telephone network, the Internet, and/or other Wide Area Networks (WANs). Similarly, the network 100 may include one or more Local Area Networks (LANs), depending on the configuration.

Coupled to the network 100 are client devices 102a, 102b, and 102c (referred to collectively as client devices 102). The client device 102a may include a personal computer (PC) or other computing device. Similarly, the client device 102b may be coupled to the network 100. The client device 102b may be a laptop or other mobile computing device and may have similar functionality as the client device 102a. Additionally, the network 100 may be coupled to a mobile communications device, such as a client device 102c. The network 100 and the client device 102c may be coupled via an access point 110 with a wired or wireless connection. If the connection with access point 110 is wireless, the client device 102 may utilize a wireless mobile telephone communications protocol, Wireless Fidelity (WiFi), Wimax, and/or other wireless protocol.

Also coupled to the network 100 is a server 106. The server 106 may be configured to provide data to the client devices 102 as a website and/or through other configurations.

Figure 2:
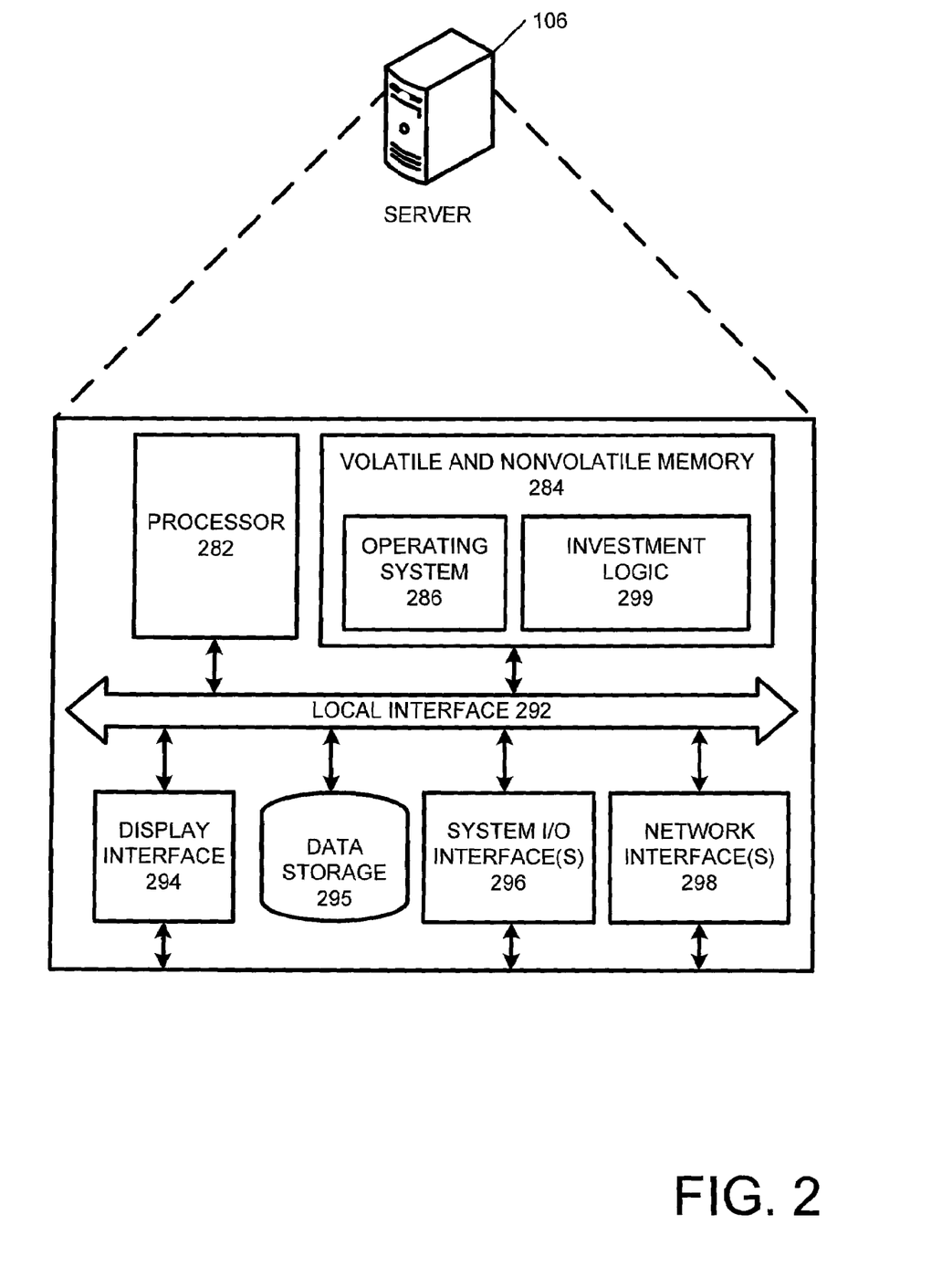
FIG. 2 is a diagram illustrating an exemplary embodiment of a computing device that may be utilized in the network from FIG. 1.

FIG. 2 is a diagram illustrating an exemplary embodiment of the server device 106 that may be utilized in the network from FIG. 1. Although a wire-line device is illustrated, this discussion can be applied to wireless devices, as well. According to exemplary embodiments, in terms of hardware architecture, the server device 106 includes a processor 282, a memory component 284, a display interface 294, data storage 295, one or more input and/or output (I/O) device interface(s) 296, and/or one or more network interfaces 298 that are communicatively coupled via a local interface 292. The local interface 292 can include, for example but not limited to, one or more buses and/or other wired or wireless connections. The local interface 292 may have additional elements, which are omitted for simplicity, such as controllers, buffers (caches), drivers, repeaters, and receivers to enable communications. Further, the local interface 292 may include address, control, and/or data connections to enable appropriate communications among the aforementioned components. The processor 282 may be a device for executing software, particularly software stored in the memory component 284. The processor 282 can include any custom made or commercially available processor, a central processing unit (CPU), an auxiliary processor among several processors associated with the server device 106, a semiconductor based microprocessor (in the form of a microchip or chip set), a macroprocessor, and/or generally any device for executing software instructions.

The memory component 284 can include any one or combination of volatile memory elements (e.g., random access memory (RAM, such as DRAM, SRAM, SDRAM, etc.)) and/or nonvolatile memory elements (e.g., ROM, hard drive, tape, CDROM, etc.). Moreover, the memory 284 may incorporate electronic, magnetic, optical, and/or other types of storage media. One should note that the memory 284 can have a distributed architecture (where various components are situated remote from one another), but can be accessed by the processor 282.

The software in the memory 284 may include one or more separate programs, which may include an ordered listing of executable instructions for implementing logical functions. In the example of FIG. 2, the software in the memory component 284 may include investment logic 299, as well as an operating system 286. The operating system 286 may be configured to control the execution of other computer programs and provides scheduling, input-output control, file and data management, memory management, and communication control and related services. Similarly, the investment logic 299 may include one or more components (in hardware, software, firmware, or any permutation). As a nonlimiting example, the investment logic 299 may include a providing component configured to provide an interface with predetermined criteria and at least one field, the at least one field configured to receive user input, the interface configured to provide investment data for at least one piece of property. Additionally, the investment logic 299 may include a receiving component configured to receive a user input for the at least one field. Similarly, the investment logic 299 may include a determining component configured to automatically determine investment data for the at least one piece of property, based on the received user input for the at least one field A system component and/or module embodied as software may also be construed as a source program, executable program (object code), script, or any other entity comprising a set of instructions to be performed. When constructed as a source program, the program is translated via a compiler, assembler, interpreter, or the like, which may or may not be included within the memory component 284, so as to operate properly in connection with the operating system 286.

The Input/Output devices that may be coupled to the system I/O Interface(s) 296 may include input devices, for example but not limited to, a keyboard, mouse, scanner, touch screen, microphone, etc. Further, the Input/Output devices may also include output devices, for example but not limited to, a printer, display, speaker, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

Additionally included are one or more of the network interfaces 298 for facilitating communication with one or more other devices. More specifically, network interface 298 may include any component configured to facilitate a connection with another device. While in some embodiments, among others, the server device 106 can include the network interface 298 that includes a Personal Computer Memory Card International Association (PCMCIA) card (also abbreviated as "PC card") for receiving a wireless network card, this is a nonlimiting example. Other configurations can include the communications hardware within the server device 106, such that a wireless network card is unnecessary for communicating wirelessly. Similarly, other embodiments include the network interfaces 298 for communicating via a wired connection. Such interfaces may be configured with Universal Serial Bus (USB) interfaces, serial ports, and/or other interfaces.

If the server device 106 includes a personal computer, workstation, or the like, the software in the memory 284 may further include a basic input output system (BIOS) (omitted for simplicity). The BIOS is a set of software routines that initialize and test hardware at startup, start the operating system 286, and support the transfer of data among the hardware devices. The BIOS is stored in ROM so that the BIOS can be executed when the server device 106 is activated.

When the server device 106 is in operation, the processor 282 may be configured to execute software stored within the memory component 284, to communicate data to and from the memory component 284, and to generally control operations of the server device 106 pursuant to the software. Software in the memory component 284, in whole or in part, may be read by the processor 282, perhaps buffered within the processor 282, and then executed.

One should note that while the description with respect to FIG. 2 includes the server device 106 as a single component, this is a nonlimiting example. More specifically, in at least one embodiment, the server device 106 can include a plurality of servers, personal computers, telephones, and/or other devices. Similarly, while the description of FIG. 2 describes the server device 106, this is also a nonlimiting example, as other components (such as the client devices 102, the access point 110, etc.) may also be included in this description.

Additionally, while the investment logic 299 is illustrated in FIG. 2 as including a single software component, this is also a nonlimiting example. In at least one embodiment, the investment logic 299 may include one or more components, embodied in software, hardware, and/or firmware. Additionally, while the investment logic 299 is depicted as residing on a single device, such as server device 106, the investment logic 299 may include one or more components residing on one or more different devices.

Figure 3:
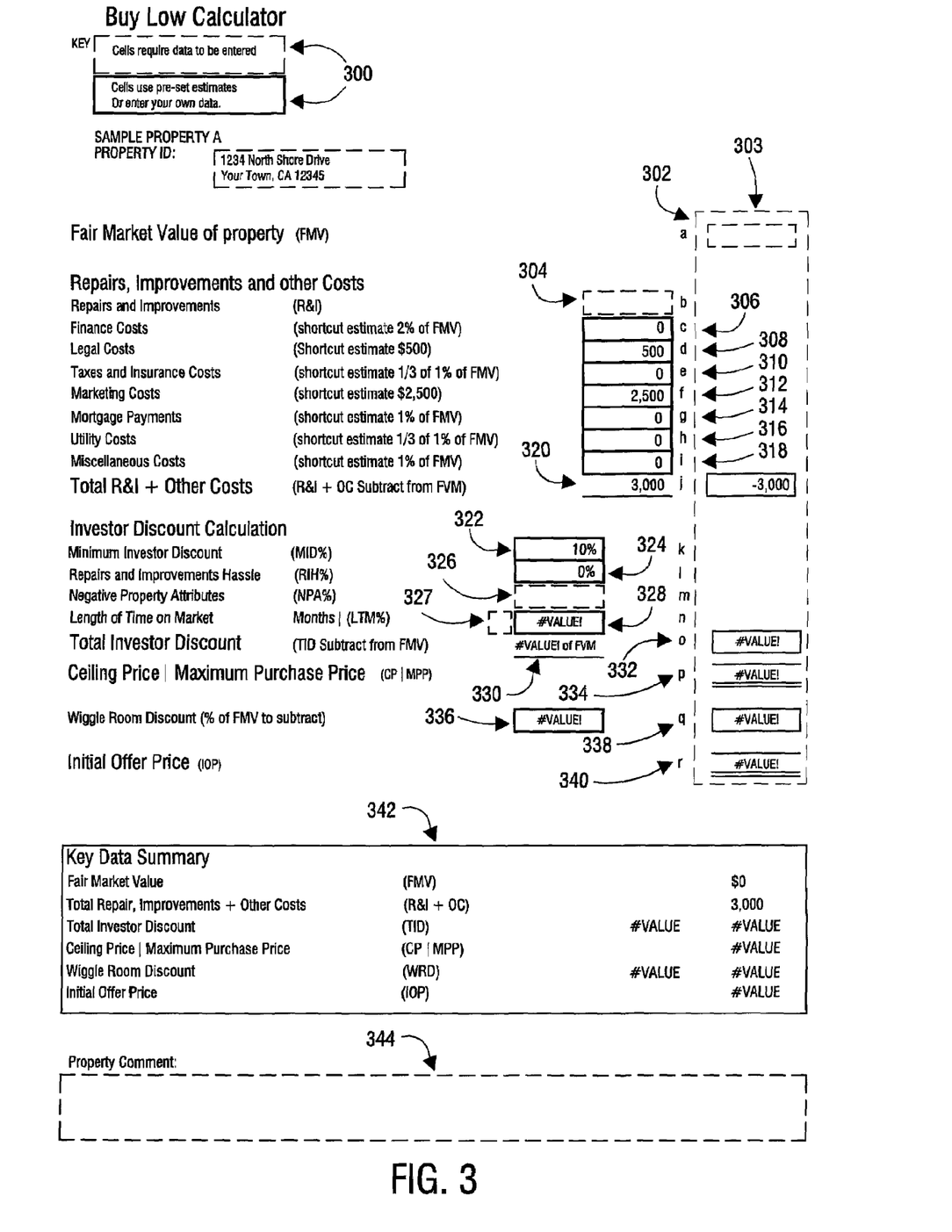
FIG. 3 is a diagram illustrating an interface that may be utilized in determining an offer price for a property, as may be presented by the server device from FIG. 2.

FIG. 3 is a diagram illustrating an interface that may be utilized in determining an offer price for a property, as may be presented by the computing device from FIG. 2. As illustrated, the interface of FIG. 3 may include a key 300 to indicate to a user which fields are configured to receive user input (dashed boxes) and which fields are configured with default values, but may be changed by a user (solid boxes). More specifically, a fair market value (FMV) field 302 is included in a totals column 303. A fair market value of the property (in this nonlimiting example 1234 North Shore Drive, Your Town, Calif. 12345) may be input by the user. An expert real estate appraiser may calculate the fair market value, however, this is not a requirement. Additionally, the fair market value may be determined as the value of the property after any planned repairs and/or improvements are complete.

Also included as a user input field is a repairs and improvements (R&I) field 304. The repairs and improvements field 304 may be configured to receive a figure indicative of the value of any repairs and improvements to the property, as determined from a contractor's work estimate (e.g., a formula may be =IF(FMV=0,"0%",IF(FMV>0,(R&I/FMV)/3))). Similarly, a finance costs field 306 may be configured to indicate the finance costs on the investor loan for the property. This value may default to 2%, however, this is not a requirement. A legal costs field 308 may be included and configured to indicate any legal costs for obtaining the title of the property and/or closing the sale of the property. This field may default to $500, but again, this is not a requirement. The taxes and insurance costs field 310 may be configured to provide a value of the taxes and insurance costs during a holding period, which may be determined to be the time after the purchase of the property until a lease/purchaser moves into the property. This value can default to an estimated ⅓ of 1% of fair market value (field 302) for a 3-month holding period, however this is not a requirement.

Also included in the exemplary interface of FIG. 3 is a marketing costs field 312. More specifically, the marketing costs field 312 may be configured to provide a value for newspaper advertisements, flyer distribution, signs, etc. for marketing the property to potential sellers. This value may vary by market, but will default, in this nonlimiting example, to between $2000 and $3000 for a 3-month period. Also included are a mortgage payments field 314, which may be configured to provide the value of any mortgage Payments during the holding period (described above). In this nonlimiting example this field defaults to an estimated 1% of fair market value, which approximates mortgage payment for months 2 and 3 during the holding period since, mortgage payments generally do not begin until the 2nd month of ownership.

Also included in the interface of FIG. 3 is a utility costs field 316. The utility costs field 316 may be configured to provide a value of the utility costs during the holding period. The utility costs can vary significantly by square footage and types of utilities. In the nonlimiting example of FIG. 3, this value may default to an estimated ⅓ of 1% of fair market value for the 3-month holding period. Also included in the interface of FIG. 3 is a miscellaneous costs field 318. The miscellaneous costs field 318 may be configured to provide a value of miscellaneous costs, such as homeowner association dues, regional insurance requirements (e.g., hurricane, flood, earthquake, etc.), real estate commissions, and any additional buffer the investor chooses to add to be on the safe side. In the nonlimiting example of FIG. 3, this field may default to an estimated 1% of fair market value. A total repairs, improvements, and other costs field 320 is also included in the interface of FIG. 3. The total repairs, improvements, and other costs field 320 may indicate a total of fields 304-318, which may reflect the total cost to buy and sell/lease the property. This value may also be provided in the totals column 303.

As also displayed in the nonlimiting example of FIG. 3, the interface may include a minimum investor discount field 322.

The minimum investor discount field 322 may be configured to provide a value for the minimum profit margin an investor should receive on the property. A repairs and improvements hassle field 324 is also included and may be configured to provide a value for the hassle an investor endures in making repairs and improvements that the seller chose not to address. In the nonlimiting example of FIG. 3, the default value for this field is ⅓ of the quotient of the repairs and improvements field 304 divided by the fair market value field 302 or $$\left(\frac{1}{3}\right)\left(\frac{R\&I}{FMV}\right).$$

Also included is a negative property attributes field 326. This is a field configured to receive user input for compensating the investor for negative attributes of a property that will remain and cannot be eliminated after the investor has completed her repairs and improvements, resulting in extra efforts to market the property, plus any reductions in value to the property anticipated because of negative attributes. For minor issues this is often 1%-3% of fair market value; for medium issues 4%-6% of fair market value; and for major issues 7%-10% of fair market value. Additionally included is a length of time on market field 327. The length of time on market field (LTM) 327 may be configured to receive a user input for the number of months the property has been for sale and calculate a discount, based on that user input. The discount may be provided in field 328. More specifically, a discount may be given for any negative stigma associated with the property due to that property sitting on the market for an extended period of time. Often the investor can add 1% for each month on the market beginning with the 3rd month, since most residential property listings are not considered "old" until after two months (e.g., a formula that may be used is IF(LTM<2.1,"0%",IF(LTM>2.9,(LTM-2)/100))). The percentage discount can be calculated and added with the values from fields 322-326 to yield a total investor discount, provided in field 330. The total investor discount is the percentage of fair market value (field 302) that the investor should pay, based on the investor discount calculation.

From the total investor discount data, a dollar value of the total investor discount may be determined by multiplying the value from field 330 with fair market value (field 303). This value may be provided in field 332. With this data, the server 106 (and/or client device 102) can calculate a maximum purchase price for the property, which may be provided in field 334. More specifically, upon receiving the desired user input for the property, the server 106 (and/or client device 102) can add (and/or subtract) the values from fields 302 (fair market value), 320 (total repairs, improvements, and other costs), and 332 (total investor discount). This value can be provided in field 334 as the ceiling price for this property.

From the maximum purchase price, an initial offer price can be determined. More specifically, upon determining the maximum purchase price, the server 106 (and/or client device 102) can determine a wiggle room discount (WRD) to start negotiations. The "wiggle room" value for field 336 may vary between 10% and 25% depending on the size of total investor discount (fields 330, 332). An equation that may be used is IF(TID>0.3,"25%",IF(TID>0.25,"20%",IF(TID>0.2, "15%",IF(TID<=0.2,"10%")))). The total investor discount (TID) may provide an indication of how willing the seller will be to negotiate (e.g., accept a low offer) which may be somewhat proportional to the number of problems with the property. The following are some rules of thumb: when TID % is 20% or less, the WRD is 10%; if TID % is 21%-25%, WRD is 15%; if TID % is 26%-30%, WRD is 20%; and if TID % is more than 30%, WRD is 25%. The dollar value of the wiggle room discount may be provided in field 338. From the wiggle room discount (field 338) and the ceiling price (field 334) and initial offer price may be determined and provided in field 340.

Additionally provided in the interface of FIG. 3 is a key data summary field 342, which may be configured to provide at least a portion of the data discussed above for quick reference. Also included in FIG. 3 is a property comment section 344 to provide comments on the property.

Figure 4:
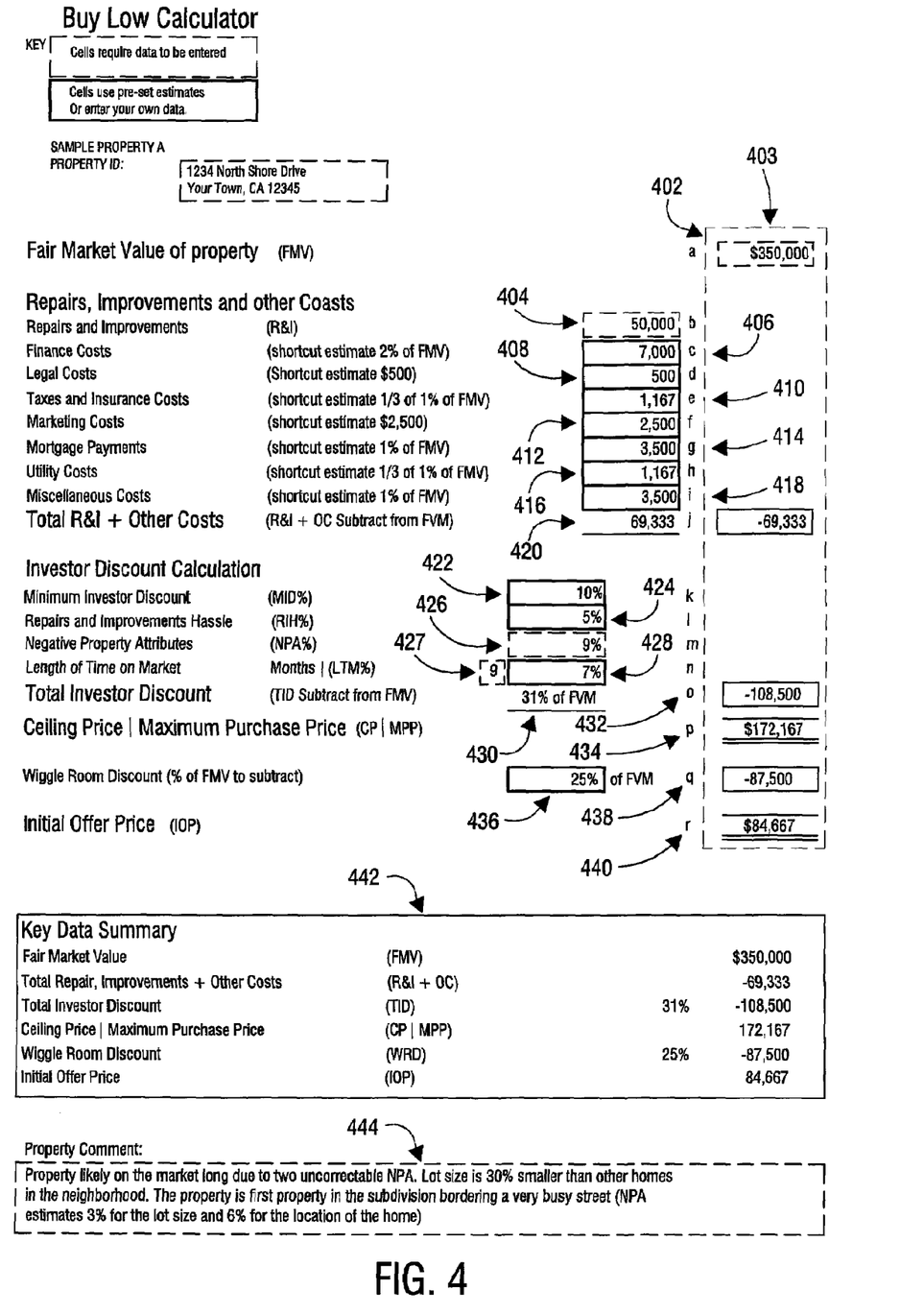
FIG. 4 is a diagram illustrating an interface that may be utilized in determining an offer price, with information provided for a specific property, similar to the diagram from FIG. 3.

FIG. 4 is a diagram illustrating an interface that may be utilized in determining an offer price, with information provided for a specific property, similar to the diagram from FIG. 3. More specifically, as illustrated in the nonlimiting example of FIG. 4, a user has indicated, in field 402, that the value of 1234 North Shore Drive is $350,000 (shown in column 403). Additionally, the user has indicated that the total costs of repairs and improvements for the property will be $50,000. Based on this data, the server 106 (and/or the client device 102) can determine that the total repairs, improvements, and other costs will amount to $69,333. One should note that, as discussed above, the values of at least a portion of the fields 406-418 are determined from default calculations on the received user input. While the default calculations may be defined by a system administrator, in at least one embodiment, a user can determine and/or change these calculations.

Additionally, the user can input a negative property attributes percentage (in field 426), as well as a length of time on market value (field 427). From this data, the server 106 (and/or client device 102) can determine a total investor discount in field 430. The server 102 (and/or client device 102) can utilize this data, as well as data from fields 422-426 to determine a total investor discount (field 430). From the total investor discount, as well as from the total repairs and improvements and other costs field 420 and the fair market value field 402, the server 106 (and/or client device 102) can determine a ceiling price (field 434) for the property. In this nonlimiting example, the ceiling price is determined to be $172,167.

From the ceiling price, a first offer price can be determined by factoring in a wiggle room discount (fields 436 and 438) from the ceiling price determined in field 434. In this nonlimiting example, the initial offer price is $84,667. Additionally a key data summary field 442 may be included to provide highlights of the data discussed above. Similarly, a property comment field 444 may be provided for the investor to document comments regarding the property.

Figure 5:
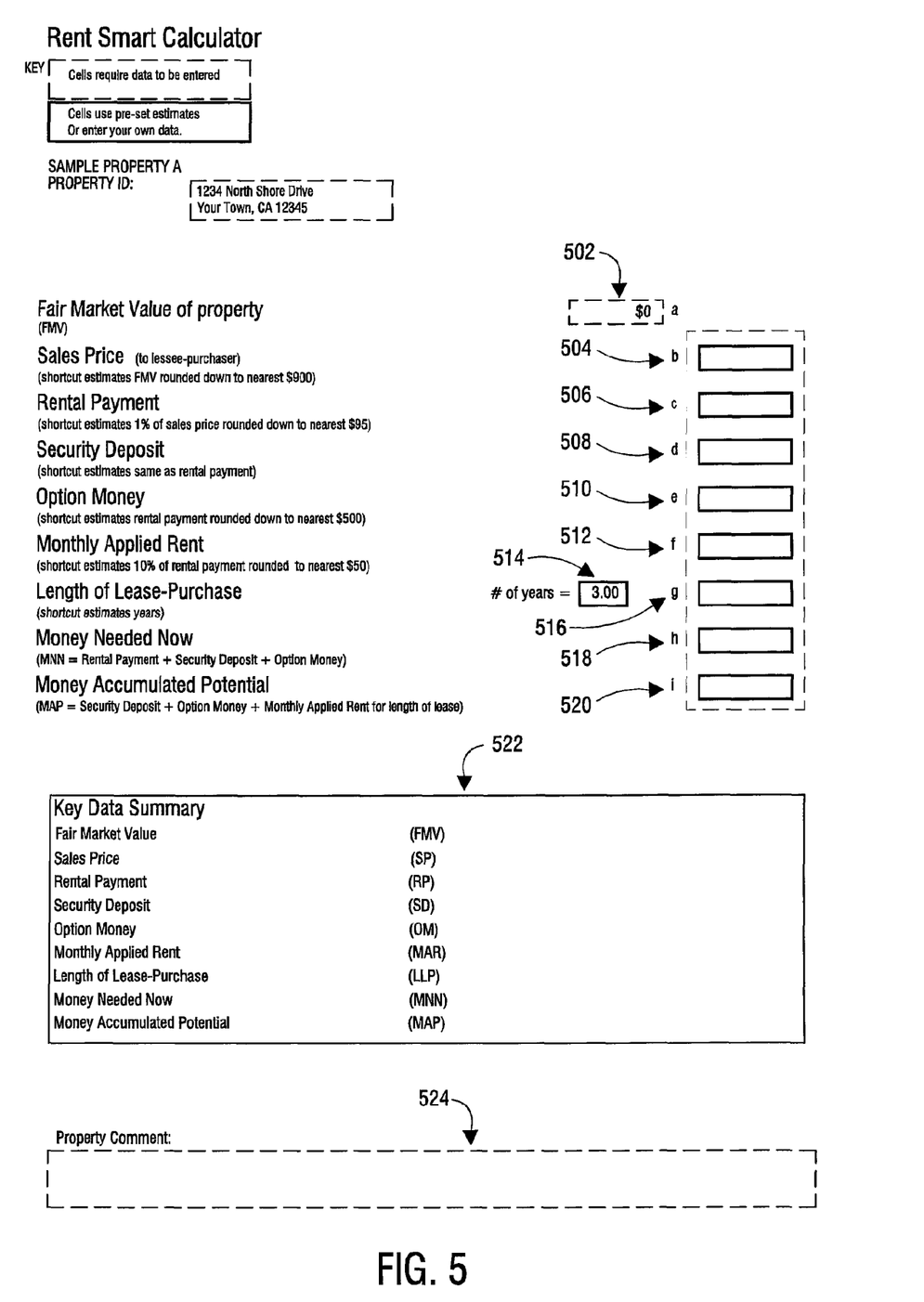
FIG. 5 is a diagram illustrating an exemplary embodiment of an interface that may be utilized in determining a rental price, similar to the diagram from FIG. 4.

FIG. 5 is a diagram illustrating an exemplary embodiment of an interface that may be utilized in determining a rental price of a property, similar to the diagram from FIG. 4. As illustrated in the nonlimiting example of FIG. 5, the user can enter the fair market value of the property in field 502. From this data, the server 106 (and/or the client device 102) can determine a sales price and provide this data in field 504. The sales price is the price that the owner would ask from the renter in a sale transaction. While any calculation can be used here, a default calculation may be the fair market value (field 502) rounded down to the nearest $900. Additionally, the server 106 (and/or client device 102) can determine a rental payment (field 506). This value is the monthly payment that a renter can be charged. While any calculation may be used, a default calculation may be 1% of fair market value, rounded down to the nearest $95. Similarly, a security deposit may be determined (field 508). The security deposit may be determined to be the same value as the rental payment, but this is not a requirement. The security deposit may be returned at the end of the lease, if the property incurs no damage during the term of the lease.

The server 106 (and/or client device 102) may also determine an option money value (field 510). The option money value may be utilized to lock the current price of the property for a lessee/purchaser for a later lease/purchase of the property. The option money may be any value, but may default to the value of the rental payment, rounded to the nearest $500. Also included in FIG. 5 is monthly-applied rent field 512. The monthly-applied rent field 512 may be configured to provide the amount of money from the rental payment that is applied to the purchase of the property in a lease-purchase scenario. In at least one nonlimiting example, the monthly-applied rent field 512 may be determined as 10% of Rental Payment rounded to nearest $50.

Also included is a length of lease-purchase field 514, 516. The lease-purchase field is configured to provide the length of time that the lessee/purchaser will lease the property prior to purchase. The field 514 may be displayed in years, with field 516 being displayed in months. A money needed now field 518 is also provided and may be configured as the amount of money the lessee/purchaser needs to pay to begin the lease-purchase. This is often calculated as the rental payment plus the security deposit, plus the option money, however this is a nonlimiting example. A money accumulated potential field 520 may be configured as the amount of money the lessee/purchaser has the potential of saving up towards their down payment if they choose to exercise their option at the end of the term. This value may often be calculated as the security deposit plus option money, plus monthly applied rent for the length of the lease/purchase. An equation that may be used is IF(RentalPayment/10>(FLOOR(RentalPayment/10,50)+25),CEILING(RentalPayment/10,50),IF(RentalPayment/10<=(FLOOR(RentalPayment/10,50)+25),FLOOR(RentalPayment/10,50))). Also included are a key data summary field 522 and a property comment field 524.

Figure 6:
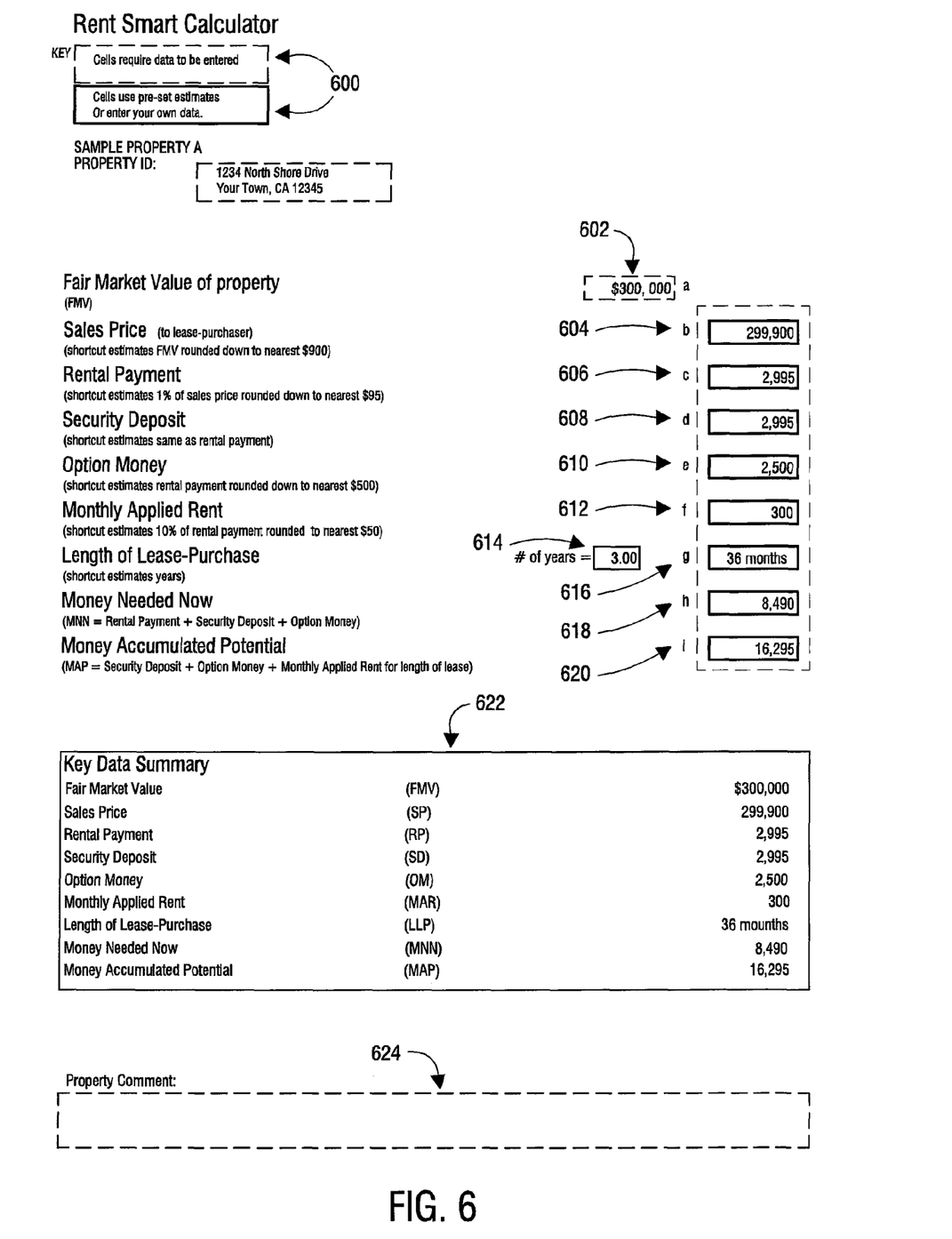
FIG. 6 is a diagram illustrating an exemplary embodiment of an interface that may be utilized in determining a rental price, with values provided for a specific property, similar to the diagram from FIG. 5.

FIG. 6 is a diagram illustrating an exemplary embodiment of an interface that may be utilized in determining a rental price, with values provided for a specific property, similar to the diagram from FIG. 5. More specifically, as illustrated in the nonlimiting example of FIG. 6, the investor has input a fair market value of $300,000 for the property (field 602). From this data, the server 106 (and/or client device 102) can determine that the sales price is $299,900 (field 604). Similarly, the rental payment is determined to be $2,995 (field 606). The security deposit is determined to be $2,995 (field 608). The option money value is determined to be $2,500 (field 610). The monthly applied rent is determined to be $300 (field 612). The length of the lease-purchase is determined to be 3 years (field 614) or 36 months (field 616). The money needed now is determined to be $8,490 (field 618). The money accumulated potential is determined to be $16,295 (field 620). Also included are a key data summary (field 622), which summarizes the data above. Additionally, a property comment field 624 is also included.

Figure 7:
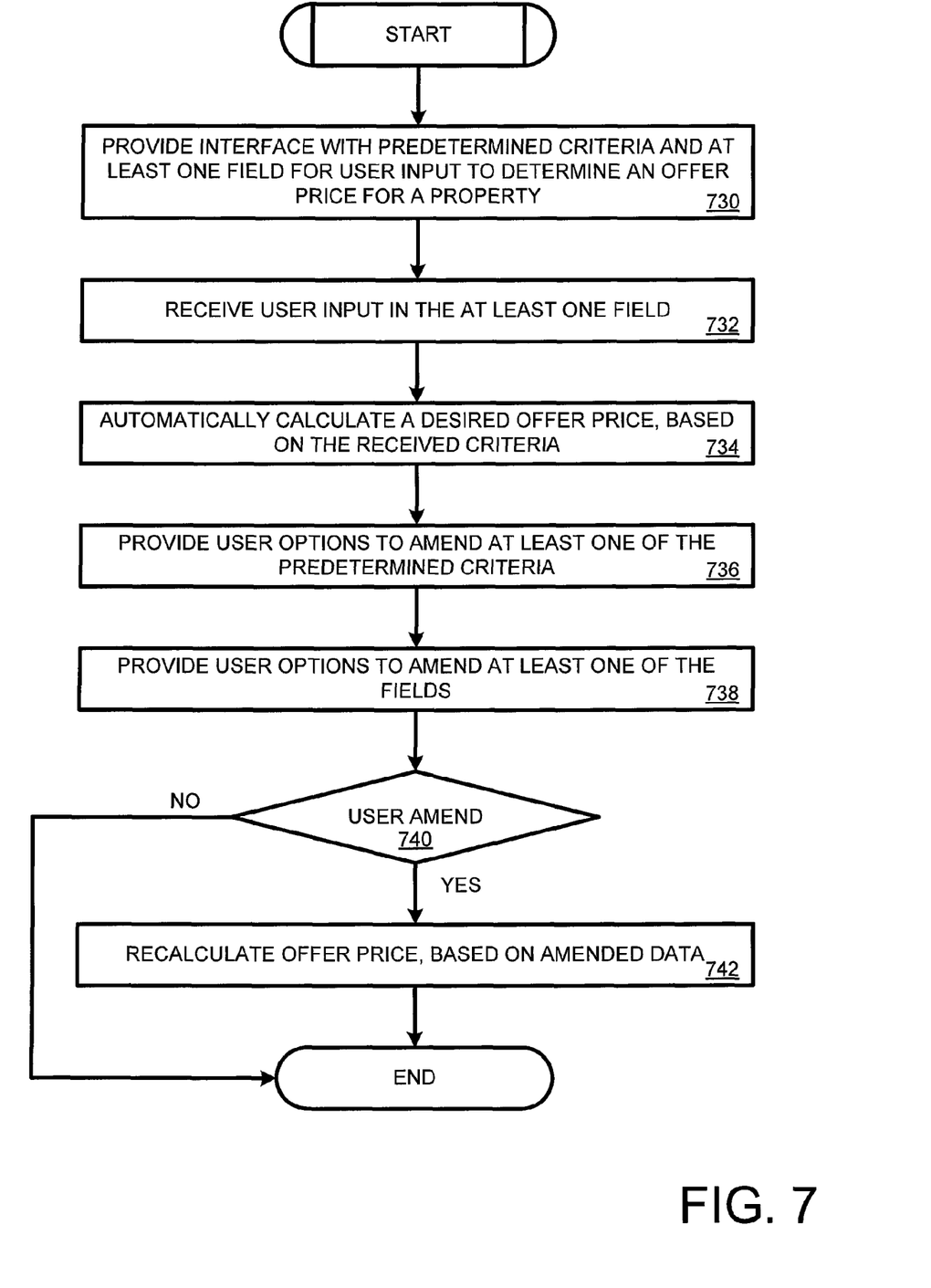
FIG. 7 is a diagram illustrating an exemplary embodiment of a process that may be utilized for determining an offer price for a property, similar to the diagram from FIG. 3.

FIG. 7 is a diagram illustrating an exemplary embodiment of a process that may be utilized for determining an offer price for a property, similar to the diagram from FIG. 3. As illustrated in the nonlimiting example of FIG. 7, an interface can be provided with predetermined criteria and at least one field configured for user input to determine an offer price for a property (block 730). The server 106 (and/or client device 102) can then receive user input in the at least one field (block 732). A desired offer price can be automatically calculated, based on the received data (block 734). User options may be provided to amend at least one of the predetermined criteria (block 736). As discussed above, one or more of the fields may have default criteria for determining a value for that particular field. The user, a system administrator, and/or others may change these criteria.

Additionally, user options may be provided to amend the value of at least one of the fields (block 738). A determination can be made whether the user amended the predetermined criteria and/or the at least one field (block 740). If the user amends the predetermined criteria and/or the at least one field, the offer price can be recalculated, based on the amended data (block 742).

Figure 8:
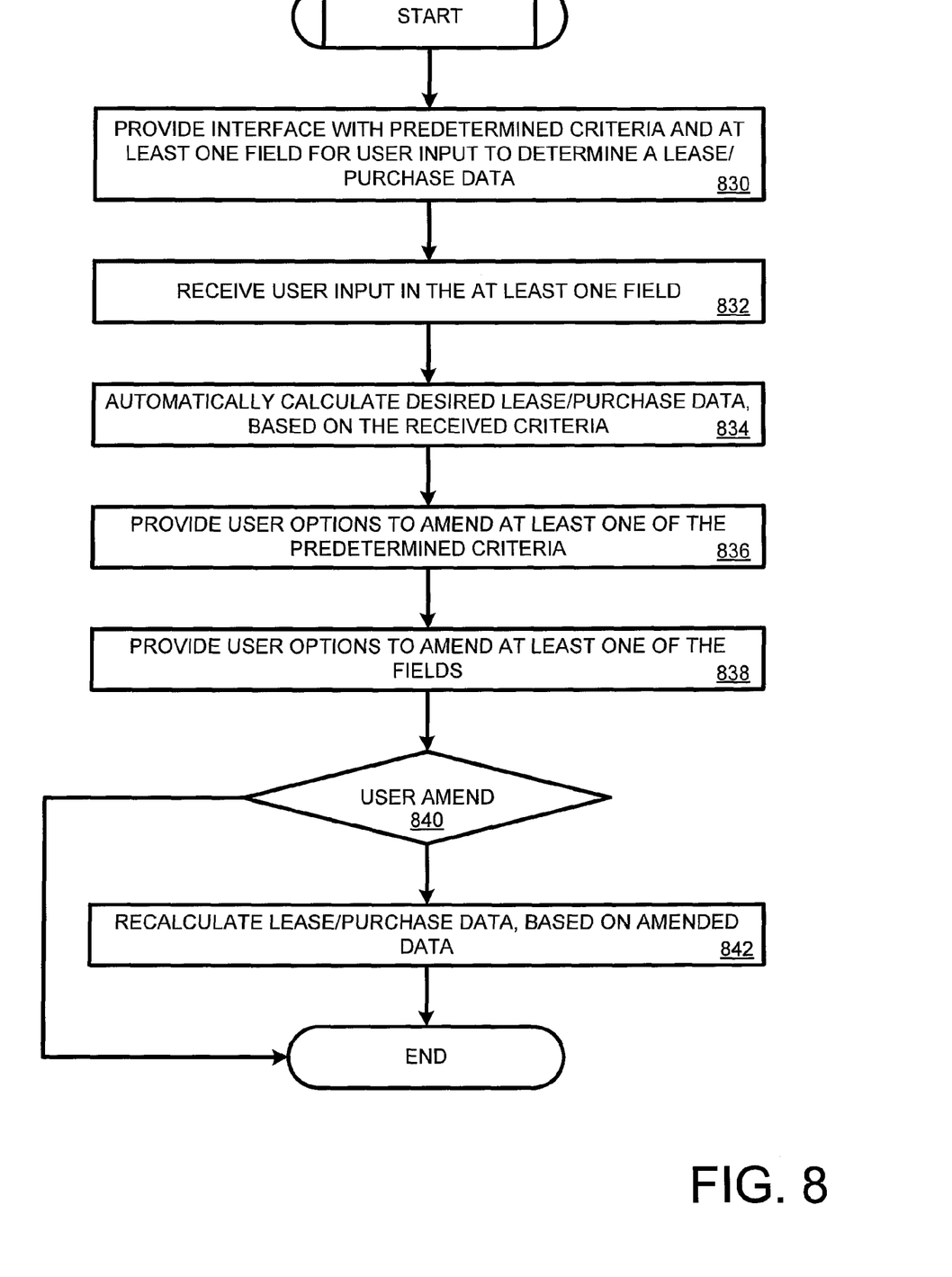
FIG. 8 is a diagram illustrating an exemplary embodiment of a process that may be utilized for determining a rental price for a property, similar to the diagram from FIG. 6.

FIG. 8 is a diagram illustrating an exemplary embodiment of a process that may be utilized for determining a rental price for a property, similar to the diagram from FIG. 6. As illustrated in the nonlimiting example of FIG. 8, an interface can be provided with predetermined criteria and at least one field configured for user input to lease and/or purchase data (block 830). The server 106 (and/or client device 102) can then receive user input in the at least one field (block 832). Desired lease and/or purchase data can be automatically calculated, based on the received data (block 834). User options may be provided to amend at least one of the predetermined criteria (block 836). As discussed above, one or more of the fields may have default criteria for determining a value for that particular field. The user, a system administrator, and/or others may change these criteria.

Additionally, user options may be provided to amend the value of at least one of the fields (block 838). A determination can be made whether the user amended the predetermined criteria and/or the at least one field (block 840). If the user amends the predetermined criteria and/or the at least one field, the lease and/or purchase data can be recalculated, based on the amended data (block 842).

The embodiments disclosed herein can be implemented in hardware, software, firmware, or a combination thereof. At least one embodiment disclosed herein may be implemented in software and/or firmware that is stored in a memory and that is executed by a suitable instruction execution system. If implemented in hardware, one or more of the embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks might occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "scan," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A computer-executable method for calculating investment data through the use of a computer, the computer-executable method comprising:

providing a computer interface with predetermined criteria and at least one input field, the at least one input field configured to receive user input, the computer interface configured to provide real estate investment data for a piece of property;

receiving user input in the at least one input field, a first user input including an estimate of repairs and improvements to be made to the piece of property a second user input including a discount percentage to compensate for negative attributes of the piece of property that cannot be overcome by repairs and improvements to the piece of property and a third user input including a length of time the property has been on the market; and automatically calculating, by a computer real estate investment data regarding at least one of a purchase price and a sales price for the piece of property, based in part on the received user input;

wherein automatically calculating the real estate investment data includes calculating an initial offer price for purchase for the piece of property wherein calculating the initial offer price includes a total repairs, improvements, and other costs calculation, a total investor discount calculation, a ceiling price calculation, and a wiggle room discount amount, wherein automatically calculating the real estate investment data further includes calculating finance costs, legal costs, taxes and insurance costs, marketing costs, mortgage payments, utility costs, and miscellaneous costs, wherein the computer interface is further configured to provide a key, a key data summary, and a property comment section, wherein the key data summary includes a fair market value, the total repairs, improvements, and other costs calculation, the total investor discount calculation, the ceiling price calculation, the wiggle room discount amount, and the initial offer price, and wherein automatically calculating the real estate investment data further includes calculating, by a computer a sales price to offer a lessee-purchaser to purchase another piece of property and calculating: a rental payment, a security deposit, option money, monthly applied rent for a lease-purchase, money needed now for a lease-purchase, and money accumulated potential for a lease-purchase.

2. The computer-executable method of claim 1, wherein automatically calculating the real estate investment data further includes calculating a maximum purchase price.

3. The computer-executable method of claim 1, wherein the user input includes a fair market value of the property.

4. The computer-executable method of claim 1, further comprising:
providing a user option on the computer interface to enable the user to amend at least a portion of the predetermined criteria.

5. A system for calculating investment data, the system comprising:
a providing component configured to provide a computer interface with predetermined criteria and at least one input field, the at least one input field configured to receive user input, the computer interface configured to provide real estate investment data for a piece of property;

a receiving component configured to receive user input for the at least one input field, a first user input including an estimate of repairs and improvements to be made to the piece of property, a second user input including a discount percentage to compensate for negative attributes of the piece of property that cannot be overcome by repairs and improvements to the piece of property, and a third user input including a length of time the property has been on the market; and a calculating component configured to automatically calculate real estate investment data regarding at least one of a purchase price and a sales price for the piece of property, based in part on the received user input;

wherein the calculating component is further configured to automatically calculate an initial offer price for purchase for the piece of property, wherein automatically calculating the initial offer price includes a total repairs, improvements, and other costs calculation, a total investor discount calculation, a ceiling price calculation, and a wiggle room discount amount wherein the calculating component is further configured to automatically calculate finance costs, legal costs, taxes and insurance costs, marketing costs, mortgage payments, utility costs, and miscellaneous costs, wherein the computer interface is further configured to provide a key, a key data summary, and a property comment section, wherein the key data summary includes a fair market value, the total repairs, improvements, and other costs calculation, the total investor discount calculation, the ceiling price calculation, the wiggle room discount amount, and the initial offer price, and wherein the calculating component is further configured to automatically calculate a sales price to offer a lessee-purchaser and automatically calculate: a rental payment, a security deposit, option money, monthly applied rent for a lease-purchase, money needed now for a lease-purchase, and money accumulated potential for a lease-purchase.

6. The system of claim 5, wherein the calculating component is further configured to automatically calculate a maximum purchase price.

7. The system of claim 5, further comprising an amending component configured to provide a user option on the computer interface to enable the user to amend at least a portion of the predetermined criteria.

8. A non-transitory computer-executable program tangibly embodied on a computer readable storage medium for calculating investment data, the computer-executable program comprising:
providing logic configured to provide a computer interface with predetermined criteria and at least one input field, the at least one input field configured to receive user input, the computer interface configured to provide real estate investment data for a piece of property;

receiving logic configured to receive user input in the at least one input field, a first user input including an estimate of repairs and improvements to be made to the piece of property a second user input including a discount percentage to compensate for negative attributes of the piece of property that cannot be overcome by repairs and improvements to the piece of property, and a third user input including a length of time the property has been on the market; and calculating logic configured to automatically calculate real estate investment data regarding at least one of a purchase price and a sales price for the piece of property, based in part on the received user input;

wherein the calculating logic is further configured to automatically calculate an initial offer price for purchase for the piece of property wherein automatically calculating the initial offer price includes a total repairs, improvements, and other costs calculation, a total investor discount calculation, a ceiling price calculation, and a wiggle room discount amount, wherein the calculating logic is further configured to automatically calculate finance costs, legal costs, taxes and insurance costs, marketing costs, mortgage payments, utility costs, and miscellaneous costs;

wherein the computer interface is further configured to provide a key, a key data summary, and a property comment section;

wherein the key data summary includes a fair market value, the total repairs, improvements, and other costs calculation, the total investor discount calculation, the ceiling price calculation, the wiggle room discount amount, and the initial offer price, and wherein the calculating logic is further configured to automatically calculate a sales price to offer a lessee-purchaser and automatically calculate: a rental payment, a security deposit, option money, monthly applied rent for a lease-purchase, money needed now for a lease-purchase, and money accumulated potential for a lease-purchase.

9. The non-transitory computer-executable program of claim 8, wherein the calculating logic is further configured to automatically calculate a maximum purchase price.

* * * * *